Jan. 17, 1956 D. T. BLATHERWICK 2,730,939
PROCESS CAMERA BACKS
Filed Sept. 30, 1954 5 Sheets-Sheet 5
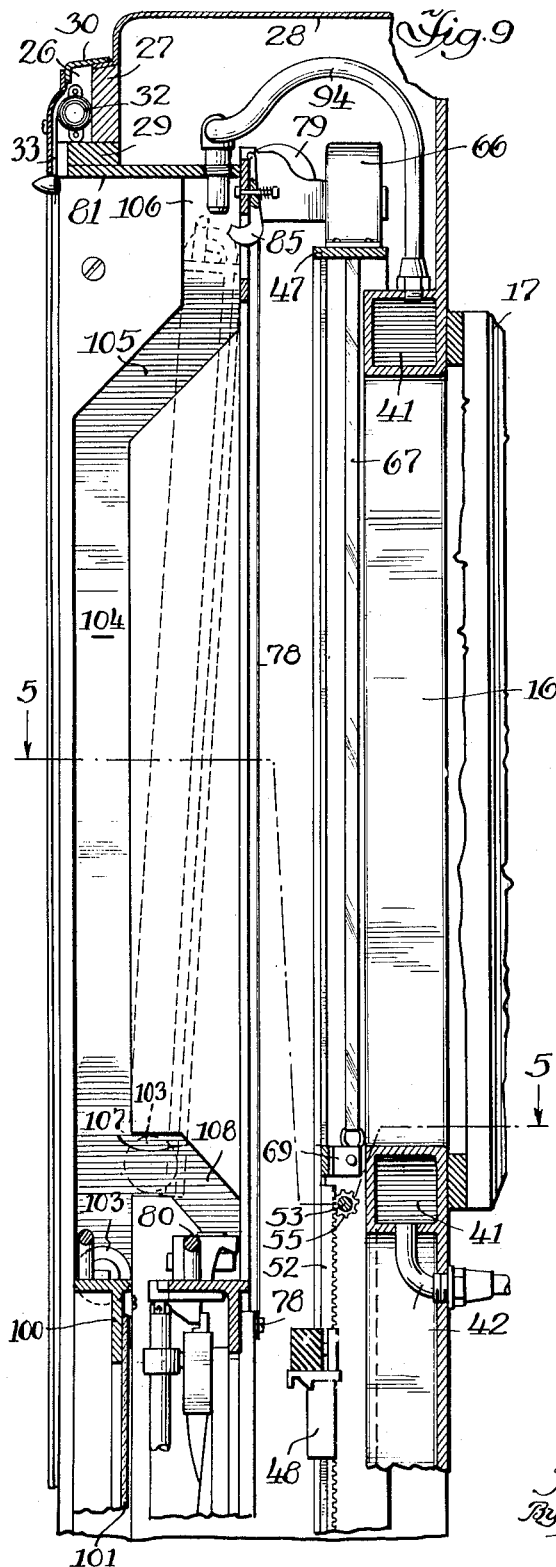
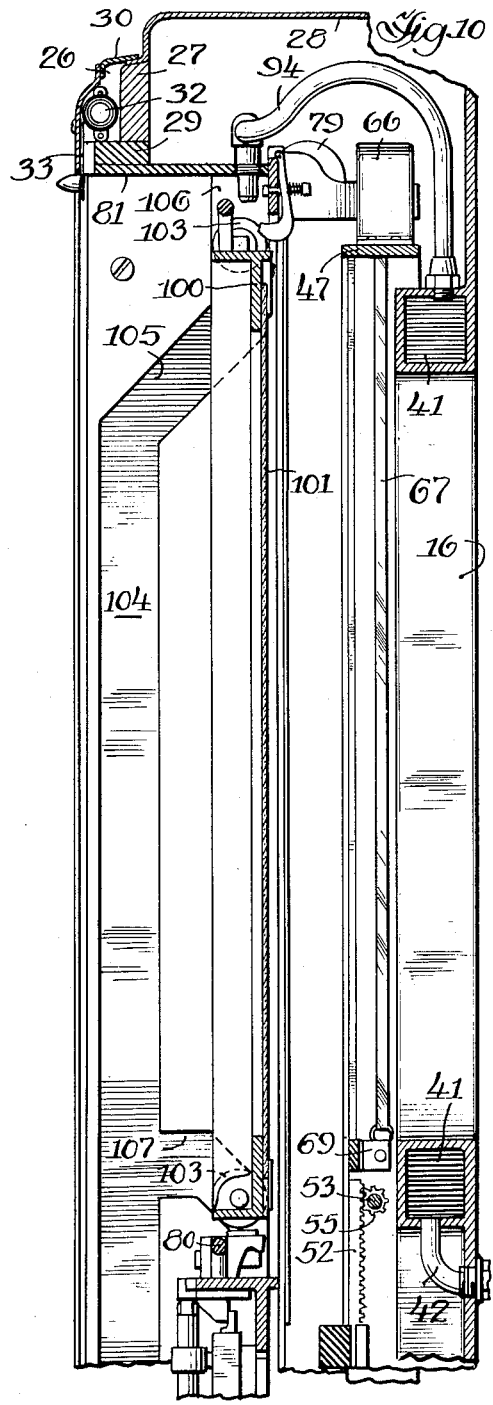
Inventor,
Delbert T. Blatherwick
By Schneider & Dressler
Attys.

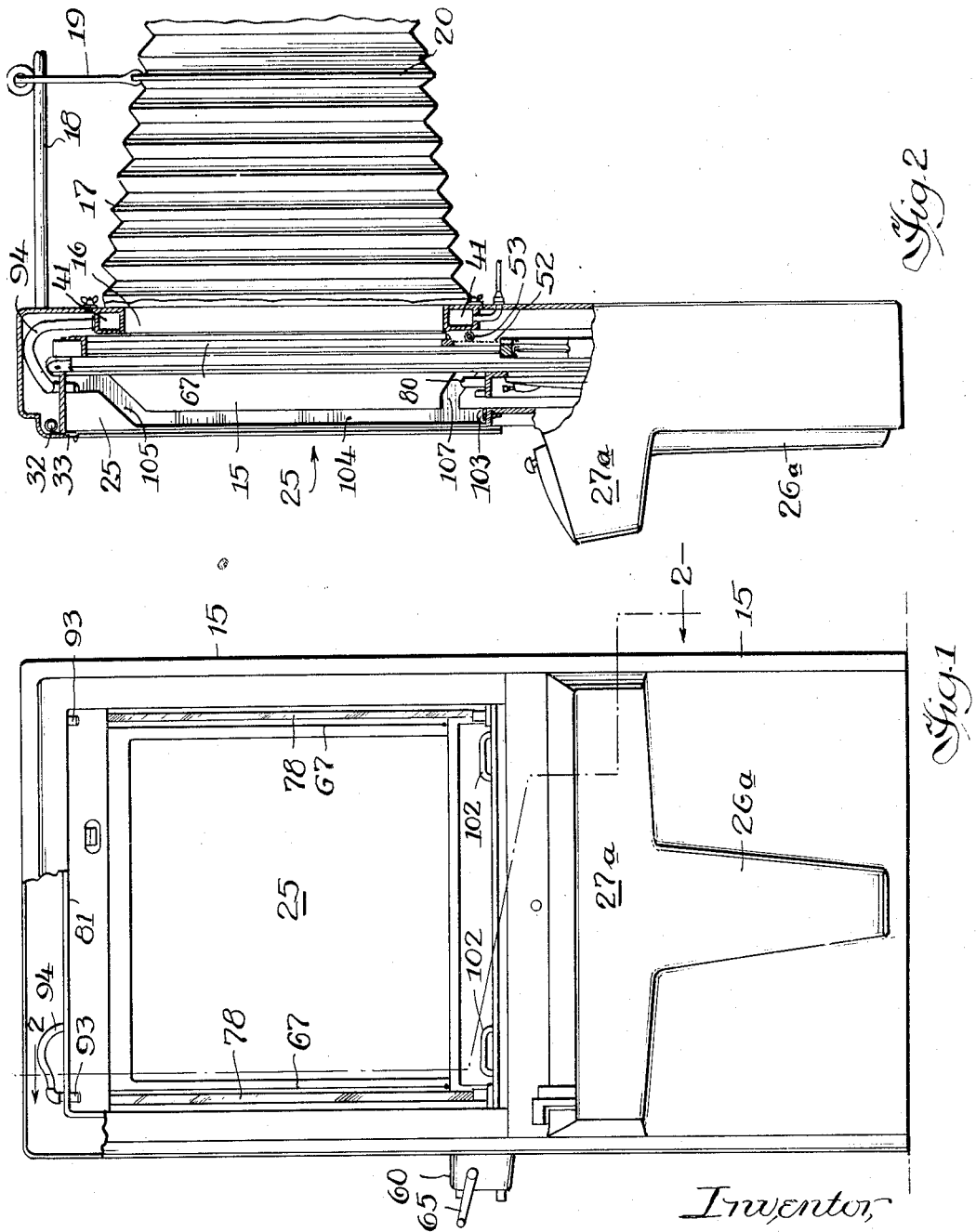

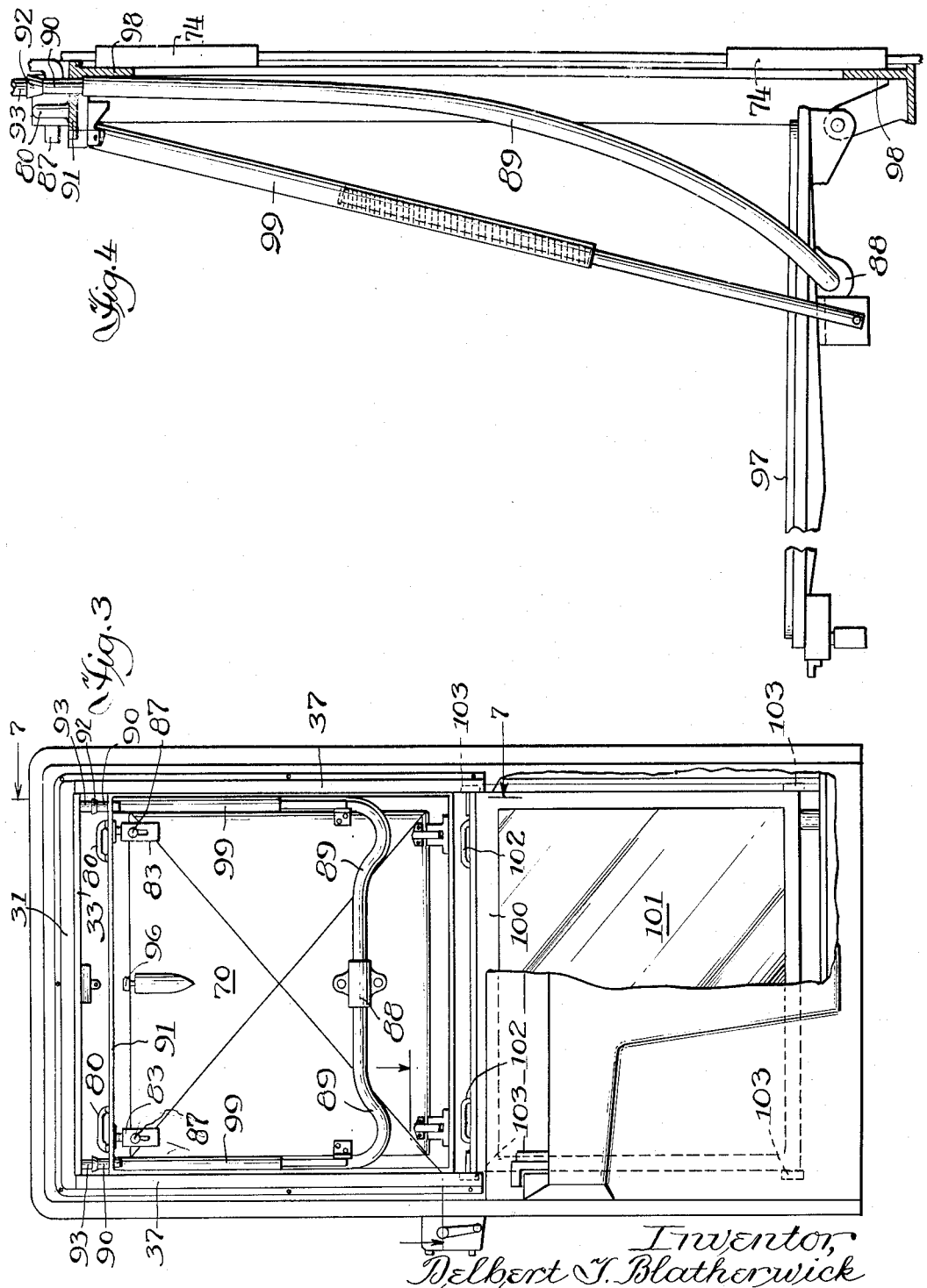

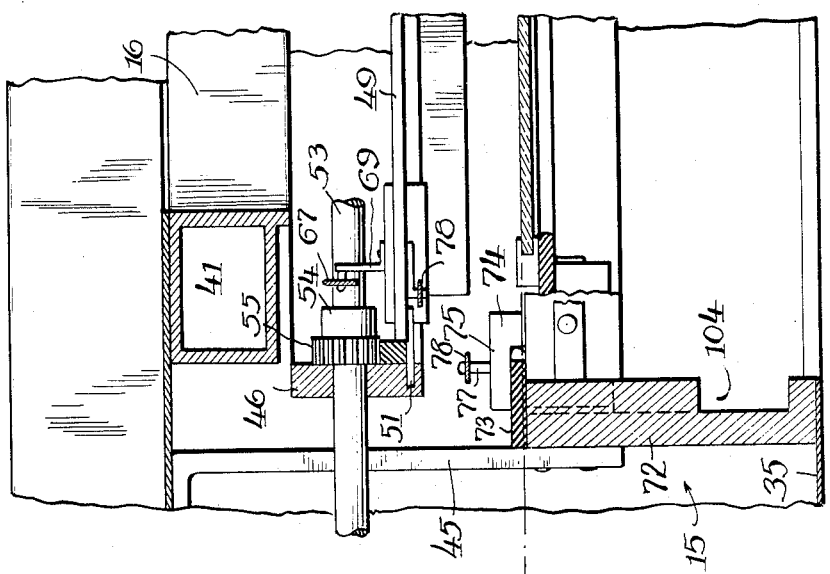
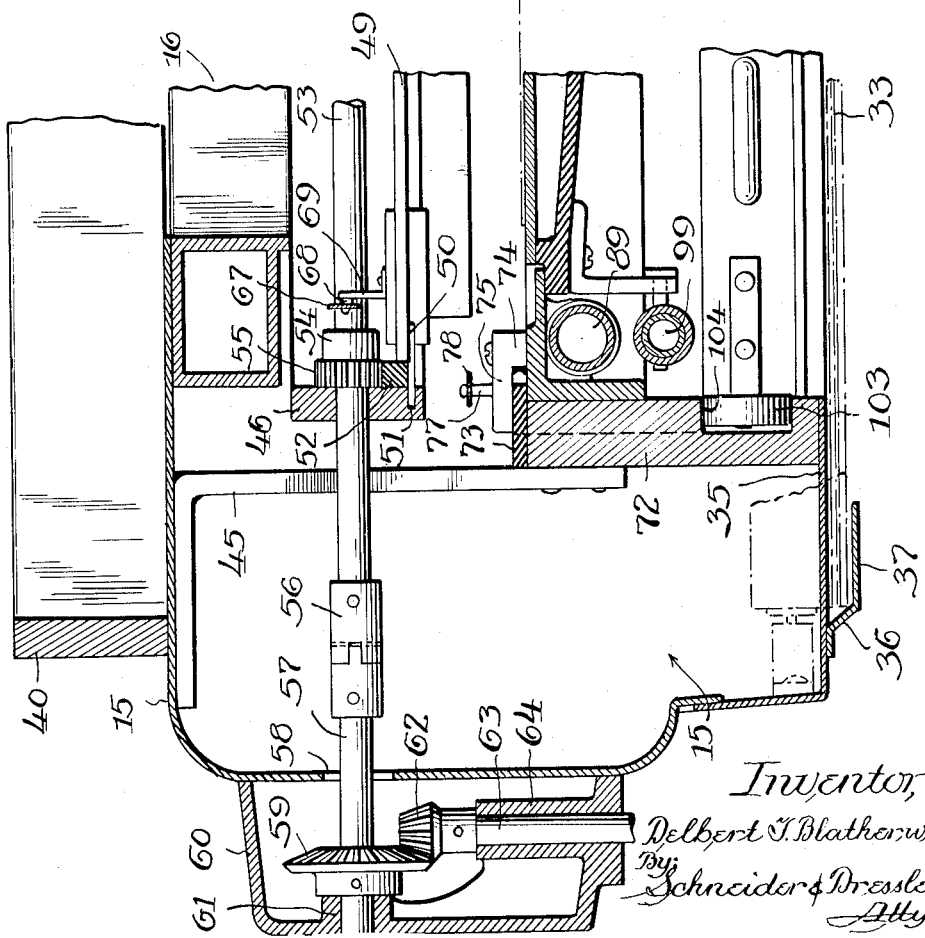

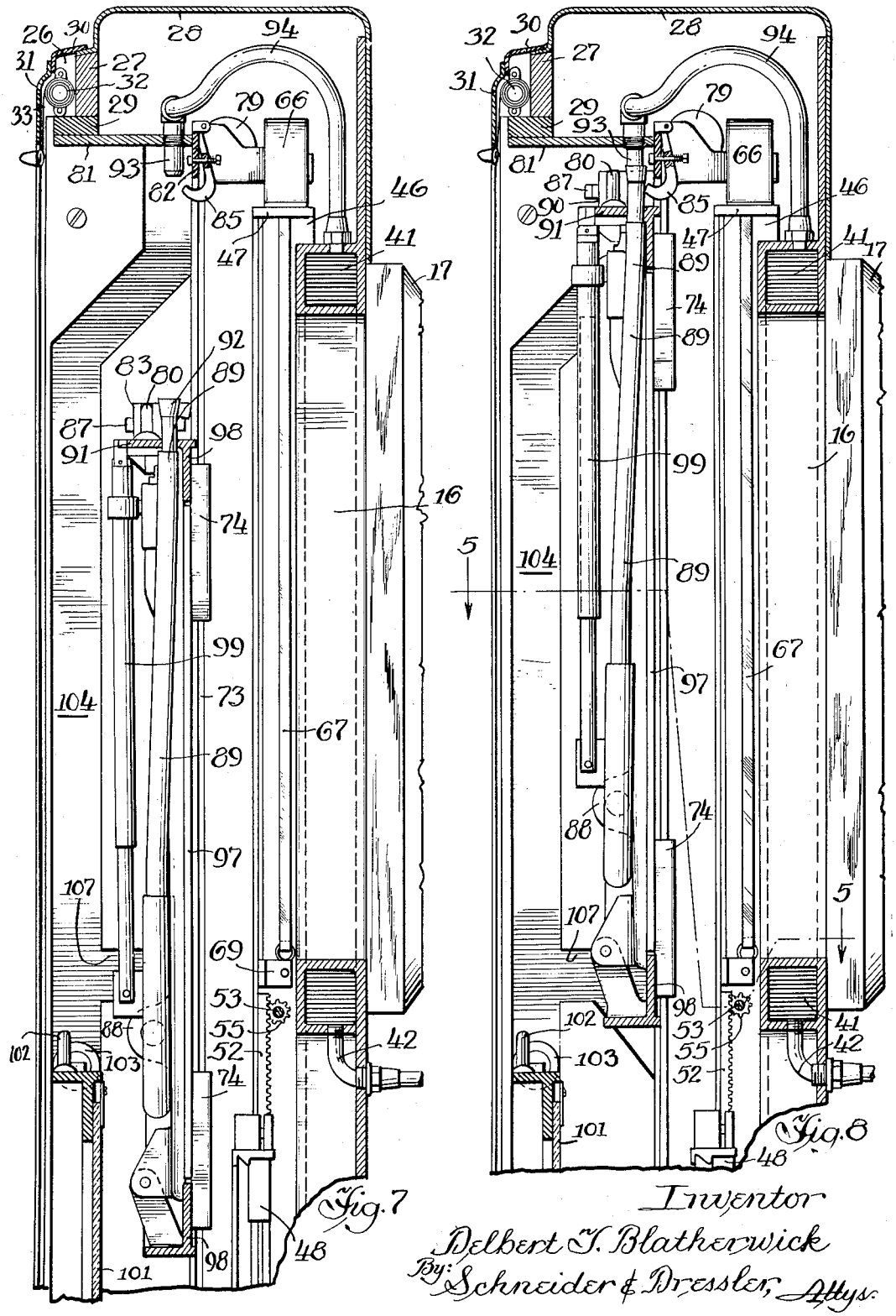

United States Patent Office

2,730,939
Patented Jan. 17, 1956

2,730,939
PROCESS CAMERA BACKS

Delbert T. Blatherwick, Chicago, Ill., assignor to Robertson Photo-Mechanix, Inc., a corporation of Illinois Application September 30, 1954, Serial No. 459,397

7 Claims. (Cl. 95—49)

The present application relates to improvements in process camera backs, and more particularly to improvements facilitating the operation of such backs and greatly reducing the space requirements for manipulation of the various parts.

In the operation of process cameras, as is well known, provision must be made for readily substituting a focusing screen (usually of ground glass) and a holder for sensitized material for one another at the will of the operator, and great accuracy in so doing is required to ensure that each will come precisely into the same focal plane. Since process cameras are frequently of large size, and the screen holders and plate or film holders are hence of considerable weight, accurate mounting of these parts so that they will be positioned properly when in use, and still may be readily interchanged, has hitherto necessitated cumbersome mountings requiring considerable space for manipulation. Thus, pivoted or swinging mountings have very generally been used, and these require the provision of large areas behind and at the sides of the camera back for manipulation into and out of operation as well as for reasonably free movement of the operator.

In accordance with the present invention these difficulties in connection with the operation of process cameras are obviated and means for interchanging the viewing screens and negative (or sensitized material) holders of process cameras are provided which require no outwardly swinging parts and nevertheless provide for their accurate positioning with respect to the focal plane of the camera lens. In carrying out the present invention, this is accomplished by providing for the movement of the parts to be interchanged in vertical paths in planes adjacent to the focal or image plane of the camera, as more fully hereinafter described.

The invention will be more fully understood from the following description, illustrated by the accompanying drawings, in which Figure 1 is a rear elevation of a process camera back constructed in accordance with the present invention, partly broken away;

Fig. 2 is a fragmentary side elevation, partly in section, of the camera back of Fig. 1, showing a portion of the bellows of the camera, the bed of the camera and the lens mounting being conventional and not being shown. The parts shown in section in Fig. 2 are indicated by the section line 2—2 on Fig. 1;

Fig. 3 is a rear elevation of the camera back of Fig. 1, showing a vacuum holder for sensitized material in position for use, with a portion of the back broken away and showing the position of the ground glass or focusing screen when not in use;

Fig. 4 is a side elevation showing the vacuum holder in open position;

Fig. 5 is a fragmentary horizontal sectional view on the line 5 in Fig. 8, with the vacuum holder in position for use;

Fig. 6 is a fragmentary horizontal sectional view showing parts corresponding to some of those shown in Fig. 5, with the viewing screen in position for use;

Fig. 7 is a fragmentary vertical sectional view showing the vacuum holder being raised to operating position;

Fig. 8 is a fragmentary vertical sectional view corresponding to Fig. 7, with the vacuum holder fully raised and in operating position;

Fig. 9 is a similar view showing the vacuum holder lowered and the viewing screen also in lowered position and, in dotted lines, in raised position while being guided into operating position; and Fig. 10 is a similar view showing the ground glass screen in operating position.

Referring more particularly to the drawings, the numeral 15 indicates a vertical casing, which forms the back of the camera and also contains the viewing screen, vacuum holder and half tone screen with provision for their vertical movement into operating position. The front of casing 15, in its upper portion, is provided with an opening or window 16, around the margin of which the camera bellows 17 is secured. Only a part of the bellows is shown. The remainder of the camera, including the lens mounting, camera bed and other parts are conventional and hence are not shown. A supporting rod 18, mounted at one end on the casing 15 and at the other end on any suitable support (not shown) carries a travelig rod 19 with a supporting loop 20 for the bellows, in the customary manner.

At the back of casing 15, opposite window 16, is a somewhat larger window 25 in alignment with window 16 and through which the operator may view the image thrown by the camera lens and manipulate the viewing screen, sensitive material holder, and half tone screen, all of which are normally housed in the lower portion of casing 15, below window 25. This lower casing portion, designated 26a, is closed to the rear and may be provided with a rearwardly projecting casing portion 27a in which conventional controls for operation of the various parts of the camera may be mounted. The operator at the rear of the camera may thus have complete control of its operation.

Means are provided to close or cover the opening or window 25 at the will of the operator, such means being preferably a curtain or shade. Thus, as shown more particularly in Fig. 7, for example, at the top and rear of the casing 15, a transverse chamber 26 is formed by a transverse bar 27, mounted in upright position and secured to the top 28 of casing 15, and a transverse bar 29 mounted in horizontal position and secured to bar 27. The bars 27 and 29 thus form the back and bottom of chamber 26, the top of which is formed by a plate member 30 secured to the top portion 28 of the casing. The front of this chamber is formed by plate 31, which depends somewhat below the top of opening or window 25 and is mounted on plate 30. A spring reel 32 carrying a curtain 33 is mounted in chamber 26. The plate member 30 may be attached to the casing top 28 by screws or other suitable means (not shown), so that, if necessary, it may be removed together with plate 31 for removal or replacement of the curtain reel.

The curtain 33 extends laterally on each side beyond the portions 35 of the casing 15 forming the sides of the rear opening or window 25, as shown most clearly in the enlarged sectional view in Fig. 5 for one side of the opening. Since the arrangement of parts at both sides of the opening is the same, only one side is shown in detail in the drawings. At each side of the opening there is secured to the rear face of the side frame portions 35 of the casing a plate 36 having a portion 37 parallel to and spaced from the side frame portion 35 and extending beyond the sides of the curtain 33, thus serving both as guides for the curtain and providing light-tight shrouds at its sides. As is readily apparent, the curtain 33 may be raised or lowered at the will of the operator to close or to expose the rear window or opening 25 of the camera back.

As set forth above, the camera bellows is mounted on casing 15, in front of the front window or opening 16. For this purpose it may suitably be attached to a rectangular frame 40, attached to casing 15 and in front of and surrounding the opening 16. A conduit 41, secured to the inner face of the front wall of the casing, also surrounds the opening 16 and is preferably rectangular in section. This conduit serves as a vacuum manifold and is connected with a suitable source of vacuum (not shown) by connection 42, extending through the front wall of casing 15. A conventional control valve (not shown) may be placed in the vacuum connection 42.

Within the casing 15 are disposed the support for a half tone or other screen, the holder for sensitized material, such as plates, film or paper, and a ground glass or other viewing screen, all capable of being stored in the lower portion of the casing below the openings or windows 16 and 25 and all vertically movable into operating position, as more fully described hereinafter.

Within the casing 15 on each side of the windows 16 and 25 there is mounted on the front wall of the casing a vertical L-shaped member 45 which extends from approximately the bottom of the casing to a point somewhat below its top. Only one of these bars is shown in the drawings (Figs. 5, 6), it being understood that a similar member is provided on the opposite side of the casing. As will more fully hereinafter appear, the members 45 serve to support the mechanism by which the vertically moving screen and vacuum holder are guided into their proper positions.

Within the casing 15, in the front portion thereof, the screen holder is located and arranged for vertical movement in front of the image plane. Since vertical movement of screen holders from a lower storage compartment into position in a camera back is known, any conventional mechanism for that purpose may be employed. Thus the screen holder may be mounted for vertical movement between two vertical bars 46, one being provided on each side of the windows 16 and 25. Only one of these bars is shown in the drawings, as in Fig. 5 and Figs. 7 to 10, it being understood that a similar bar is provided on the opposite side of the windows. The tops of the bars 46 are connected by a horizontal bar 47, which extends to and is secured on each side to one of the L-shaped members 45. A similar bar may be provided at the lower end of the case, thus forming a rectangular frame within which the screen holder moves up and down. The screen holder designated by the number 48 is attached to a transverse bar 49, to which is secured a guide member 50, which travels in a groove 51 provided in the vertical bar 46. A rack bar 52 is also secured to the guide member 50. At a point below the opening or window 16, a transverse shaft 53 is supported between openings or bearings in the vertical bars 46 on each side of the casing. This shaft carries a collar 54 with a gear 55 which meshes with the rack bar 52, so that rotation of the shaft 53 causes vertical movement of the screen holder.

The shaft 53 is continued transversely through an opening or bearing in the L-shaped vertical member 45 and terminates in the universal bearing 56. From the universal bearing 56 a continuation shaft member 57 passes through an opening 58 in the side wall of the casing 15. Exteriorly of the casing 15, a bevel gear 59 is mounted on the shaft 57 within a housing 60. This housing carries a bearing 61 to support the shaft member 57. The bevel gear 59 meshes with a bevel gear 62 mounted on shaft 63 journaled in bearing 64 in the housing 60. The shaft 63 is at right angles to the shaft 61 and extends to the rear of the casing where, as shown in Fig. 1, it is provided with a handle 65. Thus the operator at the rear of the camera, by means of the handle 65, may control the vertical movement of the screen plate holder.

In order to facilitate movement of the screen plate holder, counterbalancing means are provided. As illustrated, a spring tape reel 66 is mounted on the transverse bar 47 near one end thereof. The tape 67 from this reel extends downwardly to and engages a pin 68 on a lug 69 mounted on the bar 49. A similar arrangement may be provided at the opposite side of the casing so that the weight of the screen plate is largely counterbalanced.

In accordance with the present invention, the holder for sensitizing material, suitably a vacuum back, is likewise arranged for vertical movement in the casing so that it can be stored in the space below the camera back and raised at will into its proper operating position. In the drawings, the vacuum back is indicated generally by the numeral 70. The interior construction of the vacuum back may be conventional and is therefore not shown in detail.

In the rear portion of the casing, at each side thereof, a vertical bar 72 is mounted, being secured to the L-shaped vertical support member 45 and extending rearwardly to contact the rear wall 35 of the casing 15 just beyond the side of window opening 25. In the drawings, for example, Figs. 5 and 6, only one bar 72 is shown, there being a counterpart at the opposite side of the casing. To each of the vertical bars 72 at the front, there is secured a vertical guide member 73. To the front of the vacuum back there is secured a guide clip 74, having an arm 75 engaging the outer surface of the guide bar 73, so that the vacuum holder is guided in its vertical movement in the desired plane. Similar guide means, not shown, are provided at the opposite side of the vacuum holder. The accurate guiding of the vacuum holder is important, since it determines the plane of the sensitized material upon which the lens of the camera must focus.

Means are also provided for counterbalancing the vacuum holder. The upper guide clip 74 on each side of the vacuum holder is provided with a forwardly projecting pin 77, to which is attached a tape 78 from a spring tape reel 79, mounted in the upper portion of the casing 15.

The vacuum holders are provided at the upper edges with handles 80 for convenience in raising and lowering them.

At the top of the casing 15, there is secured to the bar 29 a transverse bar 81 which extends across the casing. To it, in turn, is secured a vertical bar 82, which likewise extends transversely across the casing.

At the top of the vacuum holder, at each side, there is provided a latch member 83, which has a forwardly projecting lug 84. The bar 82 carries at each side of the casing a spring pressed hook 85. When the vacuum holder is raised, the hook 85 engages the lug 84, as shown more particularly in Figs. 7 and 8. A release button 87 is provided on each of the latches 83. When it is desired to release the hooks 85 to lower the vacuum holder, this may be accomplished by pushing the release buttons 87.

The vacuum connection to the interior of the vacuum holder is made through the connection 88 at the back of the vacuum holder. To this are connected two similar flexible vacuum hoses 89, one extending to each side of the vacuum holder and connecting with a short tube 90 which passes through and is secured to a transverse bar 91 which forms the top of the vacuum holder. The upper portion of each tube 90 is outwardly flared, as indicated at 92.

In the transverse bar 81, at both sides of the opening 26 there are also secured the vertical tubes 93 which are connected by flexible tubes 94 to the vacuum manifold 41 at the front of the casing, hereinbefore referred to. The tubes 93 are so positioned that when the vacuum holder is raised to its uppermost position, the ends of the tubes 93 enter the flared upper ends of the tubes 90 on the vacuum holder, thereby establishing a connection between the vacuum manifold 41 and the interior of the vacuum holder. As is conventional, a control valve 96 on the vacuum holder controls the vacuum within the vacuum holder. As is customary, the rear portion 97 of the vacuum back is pivoted at its lower edge to the front portion 98 and internally spring counterbalanced telescopic arms 99 are provided at each side of the vacuum holder to counterbalance the pivoted rear portion thereof and facilitate its movement.

As illustrated, the movement of the vacuum holder within the casing is vertical, so that the holder, normally stored in the lower portion of the casing, may be directly raised into operating position or lowered into its storage position. The focusing screen is likewise stored in the lower portion of the casing and is so mounted and guided within the casing that, when the holder is lowered to its storage position, the focusing screen can be raised and brought into the same focal plane as the face of the vacuum holder.

In the drawings, for example Figs. 5 and 7 to 10, the numeral 100 designates the frame of the viewing screen, on which is mounted the ground glass screen or other desired screen material 101. To the top of the frame 100 are secured the handles 102. At each side of the frame 100, and at the upper and lower portions thereof, there are mounted the guide rollers 103. These guide rollers fit into grooves 104 formed in the vertical bars 72. These grooves form guides for the guide rollers 103 and control their movement and also the movement of the viewing screen.

The viewing screen is normally stored in the lower portion of the casing to the rear of the vacuum holder. The grooves guiding the viewing screen have a prolonged vertical portion 104 which is parallel to the path of movement of the vacuum holder. The vertical groove portions 104 extend upwardly to a point approaching the top of the window 25 and there meet a forwardly inclined portion 105 which terminates in a short vertical groove portion 106, there being counterpart groove portions in the bar at the opposite side of the window opening 25. Thus, in its vertical movement, the upper portion of the viewing screen is guided vertically in a path parallel to that of the vacuum holder and spaced therefrom until it reaches the top of the groove portion 104. It is then guided forwardly by the inclined groove portion 50 and enters the vertical groove portion 106, in which it may move upwardly to a small extent.

As the upper guide rollers of the viewing screen enter the short vertical groove section 106 at the top of the casing, the lower guide rollers are brought opposite a transverse groove portion 107, which connects with a downwardly and forwardly inclined groove portion 108.

Thus, the upward movement of the viewing screen is first directly vertical and parallel to the line of movement of the vacuum holder. As the viewing screen approaches the upper limit of its movement, the guide rolls at the top of the viewing screen are guided forwardly and into the short vertical groove portion 106. At the same time, the guide rollers at the lower portion of the viewing screen are in a position to enter the transverse groove section 107, as shown more particularly in dotted lines in Fig. 9. The lower portion of the viewing screen is then pushed forwardly; the guide rolls at the lower portion of the screen enter the forwardly and downwardly inclined groove section 108 and the entire screen is then lowered into its operating position, in which it is solidly held by the position of the guide rolls in the groove portions 106 and 108. In this position, the face of the ground glass of the viewing screen is in the same plane as the sensitized material carried by the vacuum holder when the lattter is in operating position. In removing the viewing screen to permit the raising of the vacuum holder into its operating position, the lower portion of the frame of the viewing screen is raised and moved rearwardly, thus raising the entire viewing screen and bringing it again to the position shown in dotted lines in Fig. 9. The rearward movement of the lower portion of the viewing screen is then continued so that the guide rolls enter the vertical groove section 104. The viewing screen may then be lowered into its normal storage position in the rear of the vacuum holder.

It will be readily apparent that any type of holder for sensitized material may be used in place of the vacuum holder as hereinbefore described.

As will also be apparent from the foregoing description, by the present invention I have provided a rear case for a process camera in which the viewing screen and holder for sensitized material as well as the half toned or other screen may be stored in the casing and may be brought to its operating position accurately at the will of the operator by vertical movement within the casing. With the device of the present invention it is therefore no longer necessary to provide space to the rear or side of the camera for swinging or lateral movement of the holder, viewing screen or other parts, as has been customary in the past. Furthermore, by the present invention I am enabled to store the working parts of the camera compactly and nevertheless have them immediately available for the use of the operator, with assured accuracy in placement of the various parts as used.

Although the invention has been described in connection with a preferred embodiment thereof, it is to be understood that the details thereof are not to be regarded as limitations upon the scope of the invention, except insofar as included in the accompanying claims.

I claim:

1. A process camera back having a casing provided with aligned openings in the rear of the camera, said casing extending vertically from said openings, the extended portion of said casing forming storage space for a focusing screen holder and a sensitized material holder, said holders being vertically movable within the casing and the operating positions of said holders being between and in alignment with said openings, guiding means within said casing for one of said holders for guiding it in vertical movement from the storage space in the casing to its operating position with its forward face in the focal plane of the camera, guiding means for the other of said holders for guiding it in vertical movement from the storage space in the casing in a path parallel to and spaced from the path of movement of said first mentioned holder, said second guiding means being formed to carry the second mentioned holder, on approaching its limit of movement, into the vertical path of movement of the first mentioned holder, and to bring the second mentioned holder into operating position with its forward face in the focal plane of the camera.

2. A process camera as set forth in claim 1 having a screen holder vertically movable in said casing from the storage space into alignment with said openings therein, and guide means for guiding said screen holder in a path parallel to that of the first mentioned holder and to an operating position in front of the operating position of said first mentioned holder.

3. A process camera back having a casing provided with aligned openings in the rear of the camera, said casing extending vertically downwardly from said openings, the extended portion of said casing below said openings forming a storage space for a focusing screen holder and a sensitized material holder, said holders being vertically movable within the casing and the operating positions of said holders being between and in alignment with said openings, guiding means within said casing for one of said holders for guiding it vertically between the storage space in the lower portion of the casing and its operating position in which its forward face is in the focal plane of the camera, guiding means for the other of said holders for guiding it vertically upward from the storage space in the casing in a path parallel to and spaced from the path of movement of said first mentioned holder, said second guiding means being formed to carry the second mentioned holder, on approaching its upper limit of movement, into the vertical path of movement of the first mentioned holder and to bring the second mentioned holder into operating position with its forward face in the focal plane of the camera.

4. A process camera back having a vertical casing provided with aligned openings in its upper portion, the front opening being directed toward the camera, and the lower portion of said casing forming a storage space, a sensitized material holder and a focusing screen holder vertically movable within said casing from the lower storage space therein to operating positions between said aligned openings, each of said holders, when in operating position, having its forward face substantially in the focal plane of the camera, vertical guides for guiding the movement of said sensitized material holder and means for locking it in operating position, said locking means being releasable to permit the return movement of said sensitized material holder to the storage space within the casing, and guide means for guiding the vertical movement of said focusing screen vertically in a path parallel to and spaced from the path of movement of the sensitized material holder, the guide means for the focusing screen holder being provided at its upper portion with a forwardly inclined portion terminating in a second vertical portion parallel to said first vertical portion, a transverse guide portion communicating with the first mentioned vertical guide portion for the focusing screen holder at a point at a distance below the upper limit of movement of said focusing screen holder approximately equal to the height of said focusing screen holder, said transverse portion terminating in a downwardly and forwardly inclined portion, whereby, when the upper portion of the focusing screen holder reaches the upper limit of its movement, the lower portion thereof may be moved forwardly and downwardly to rest in operating position.

5. A process camera back having a vertical casing provided with aligned openings in its upper portion, the front opening being directed toward the camera, and the lower portion of said casing forming a storage space, a sensitized material holder and a focusing screen holder vertically movable within said casing from the lower storage space therein to operating positions between said aligned openings, each of said holders, when in operating position, having its forward face substantially in the focal plane of the camera, vertical guides for guiding the movement of said sensitized material holder and means for locking it in operating position, said locking means being releasable to permit the return movement of said sensitized material holder to the storage space within the casing, and guide means for guiding the vertical movement of said focusing screen, said guide comprising vertical side members having guide grooves cooperating with the focusing screen holder, the guide grooves being each formed with vertical groove portions for guiding said focusing screen holder in a path parallel to and spaced from the path of movement of the sensitized material, said vertical groove portions connecting at the top with forwardly inclined groove portions terminating in second vertical groove portions parallel to said first vertical groove portions, transverse groove portions communicating with the first mentioned vertical groove portions for the focusing screen holder at a point at a distance below the upper limit of movement of said focusing screen holder approximately equal to the height of said focusing screen holder, said transverse portions terminating in downwardly and forwardly inclined groove portions, whereby, when the upper portion of the focusing screen holder reaches the upper limit of its movement, the lower portion thereof may be moved forwardly and downwardly to rest in a position with its forward face in the focal plane of the camera.

6. A process camera back as set forth in claim 5 having a screen holder vertically movable in said casing from the storage space into alignment with said openings therein, and guide means for guiding said screen holder in a path parallel to that of the first mentioned holder and to an operating position in front of the operating position of said first mentioned holder.

7. In a process camera back having a sensitized material holder and a focusing screen holder vertically movable from positions below the camera back to operating positions such that each of said holders, when in operating position, has its forward face substantially in the focal plane of the camera, vertical guides for guiding the movement of said sensitized material holder from its position below the camera back to the operating position and means for locking it therein, said locking means being releasable to permit the return movement of said sensitized material holder, and guide means for guiding the vertical movement of said focusing screen vertically from its position below the camera back to its operating position in a path parallel to and spaced from the path of movement of the sensitized material holder, the guide means for the focusing screen holder being provided at its upper portion with a forwardly inclined portion terminating in a second vertical portion parallel to said first vertical portion, a transverse guide portion communicating with the first mentioned vertical guide portion for the focusing screen holder at a point at a distance below the upper limit of movement of said focusing screen holder approximately equal to the height of said focusing screen holder, said transverse portion terminating in a downwardly and forwardly inclined portion, whereby, when the upper portion of the focusing screen holder reaches the upper limit of its movement, the lower portion thereof may be moved forwardly and downwardly to rest in a position with its forward face in the focal plane of the camera.

No references cited.